United States Patent
Mason

(10) Patent No.: US 7,127,706 B2
(45) Date of Patent: Oct. 24, 2006

(54) SYSTEM AND METHOD FOR CONTROLLING SOFTWARE CONFIGURATION IN A CONVERTIBLE SELF-CHECKOUT STATION

(75) Inventor: Timothy E. Mason, Buford, GA (US)

(73) Assignee: NCR Corporation, Dayton, OH (US)

( * ) Notice: Subject to any disclaimer, the term of this patent is extended or adjusted under 35 U.S.C. 154(b) by 764 days.

(21) Appl. No.: 10/017,971

(22) Filed: Dec. 14, 2001

(65) Prior Publication Data

US 2003/0115103 A1 Jun. 19, 2003

(51) Int. Cl.
*G06F 9/44* (2006.01)
*G06F 17/00* (2006.01)

(52) U.S. Cl. ........................ 717/121; 235/283
(58) Field of Classification Search ........ 717/106–107, 717/120–122; 235/2, 7 R, 383
See application file for complete search history.

(56) References Cited

U.S. PATENT DOCUMENTS 5,555,060 A * 9/1996 O'Brien et al. ............. 396/508
5,584,362 A * 12/1996 Dumont ........................ 186/61
6,213,395 B1 * 4/2001 Dejaeger et al. ............. 235/383
6,672,506 B1 * 1/2004 Swartz et al. ................ 235/383
2003/0001007 A1 * 1/2003 Lee et al. ..................... 235/383

FOREIGN PATENT DOCUMENTS

EP 1098277 A2 * 5/2001

OTHER PUBLICATIONS

Braga et al., "A self-validating valve", IEEE, pp.: 1-6, 1999.*

* cited by examiner

*Primary Examiner*—Ted T. Vo
(74) *Attorney, Agent, or Firm*—Maginot, Moore & Beck, LLP; Harden E. Stevens, III

(57) ABSTRACT

A system determines the physical configuration of a convertible checkout station and configures the software to operate the station in correspondence with the determined configuration. The system comprises a physical configuration actuator that responds to a checkout station physical configuration and a physical configuration signal generator responsive to the actuator to generate a signal identifying the physical configuration of the checkout station. The signal may be provided to a processor that controls operation of the station and the processor uses the signal to configure software for the station.

31 Claims, 7 Drawing Sheets

SYSTEM AND METHOD FOR CONTROLLING SOFTWARE CONFIGURATION IN A CONVERTIBLE SELF-CHECKOUT STATION

FIELD OF THE INVENTION

This invention relates generally to methods and systems for converting a self-checkout station to a cashier-assisted station and, more particularly, to methods and systems for converting the operational characteristics of a convertible self-checkout station.

BACKGROUND OF THE INVENTION

Self-checkout stations at grocery stores and other retail stores are well known. The stations permit a consumer to scan items for purchase so the station may identify the items and a corresponding price. When the consumer indicates all items for purchase have been presented to the terminal, a sub-total is accumulated, any taxes and discounts are computed, and a total amount due is displayed for the consumer. The station then allows the consumer to select a payment method. The station presents menu selections to the consumer so funds are transferred to the retailer's account. Upon confirmation of payment, the items are released to the consumer.

A self-checkout station typically includes a terminal, a scanner and scales for reading unit price codes (UPC) and determining item weight, a cashier keypad and display, a POS terminal for payment entry, a receipt printer, a change unit, and a checkout area for holding items once they have been scanned. The terminal also includes a display, a processor, memory, programmed instructions, and data peripherals to control the operations of the station. The programmed instructions may contain modules for querying for item prices, computing totals and performing other functions related to the purchase of items through a self-checkout station. Some checkout station may also include a security application program that operates to reduce the likelihood that the consumer leaves without scanning all of the items or exchanges scanned items with more expensive items that have not been scanned.

Because a self-checkout station includes the components typically found in a cashier-assisted station, self-checkout stations have been constructed that support the conversion of a self-checkout station into a cashier-assisted station. Self-checkout stations that may be converted to cashier-assisted stations and vice versa typically include a conveyor belt for moving items to a scanner/scale of the checkout terminal. In these convertible checkout stations, the scanner is mounted on a swivel atop a sliding drawer so the scanner may be pulled from the checkout station and turned to either face consumers in self-checkout station operation or away from the consumer in cashier-assisted station operation. Typically, the sliding drawer is released by depressing a drawer latch and pulling the drawer away from the checkstand. When the drawer is fully retracted, the scanner may be rotated and realigned with the sliding drawer. The drawer is then pushed into engagement with the checkstand and adjustments are made to align the scanner with the conveyor belt for cashier-assisted operation. A cashier display and keypad are mounted on a swivel to the top of a consumer display for the scanner. After the scanner is rotated, the cashier display is rotated on its swivel so it is returned to a position that faces away from the consumer side of the station. In this manner, a cashier may use a keypad or the scanner and scales for item data entry. The keypad remains accessible to the consumer for payment. To return to self-checkout mode, the described procedure is reversed so the sliding drawer may be released and pulled out, the scanner and scales rotated, the drawer returned to the checkstand in an orientation that permits consumer operation and the cashier display rotated towards the cashier side.

Once the scanner has been oriented for either cashier-assisted or consumer operation, the station software needs to be configured for the appropriate mode of operation. For example, the security application may operate differently with respect to certain events regarding the movement of items into and out of the checkout area depending upon the mode in which the scanner is operating. Typically, the person who is converting the station from one type of operational mode to another configures the software for the operational mode of the station. Unfortunately, this person may forget to reconfigure the software for the current operational mode. Improperly configured software may permit a consumer to more easily defraud the store or make errors that impede the unattended operation of the self-checkout station. The requirement of manually reconfiguring the software also increases the time associated with the conversion of the station, especially if the one who is converting the station is distracted during the conversion process and leaves the station for customer service.

Another problem with conversion of a checkout station occurs during the reboot or reapplication of power following system failure. In event of such a failure, the system reboot or power application causes the station to configure the software operating the station. If the station did not store some indicator of its last operational mode, the station does not know whether to configure the software for cashier-assisted or self-checkout mode. If its default configuration is cashier-assisted and the station is physically configured for self-checkout mode, the same erroneous operations or conditions for defrauding the store may exist.

What is needed is a way of identifying the physical configuration of the station so the software configuration of the station is correlated to the proper operational mode.

What is needed is a way of reducing the time required for converting a checkout station from one operational mode to another.

SUMMARY OF THE INVENTION

The above-noted limitations of previously known systems and methods for converting the operational mode of checkout stations have been overcome by a system and method that operate in accordance with the principles of the present invention. The system of the present invention comprises a physical configuration actuator that responds to a checkout station physical configuration and a physical configuration signal generator responsive to the actuator to generate a signal identifying the physical configuration of the checkout station. The physical configuration actuator may be tab, mounted member, or the like. The signal generator may be a plunger switch that is mounted to the checkstand, sliding drawer, or scanner housing. The actuator engages the switch to generate a first signal in one operational mode of the station and releases the switch to generate a second signal in the second operational mode. For example, aligning the swivel platform with the sliding drawer after rotation or returning the drawer into engagement with the checkstand may cause the plunger of the switch to be depressed by the tab actuator in one operational mode. During the next station conversion, rotation of the scanner may then cause the tab to release the plunger of the switch and it remains extended when the sliding drawer is returned to the checkstand and the switch is no longer proximate the actuator tab. The signal generated by the switch provides an indication of the operational mode for the station. Reed and other proximity switches may be used to generate a signal that has one state to indicate a first operational mode for the station and a second state to indicate the second operational mode. The signal is provided to the processor controlling operation of the station and the processor uses the signal to configure software for the station. Thus, the signal reduces the likelihood of an erroneous software configuration following station conversion and the signal from the indicator may be used to confirm the software configuration of the terminal following power application.

The method of the present invention includes generating a configuration signal corresponding to a checkout station physical configuration and determining a software configuration for the checkout station corresponding to the physical configuration indicated by the generated signal. The physical configuration of the checkout station may be determined from a plunger, reed or other switch that is mounted to engage an actuating structure or be proximate another switch component in one operational mode and disengage such structure in the other operational mode. In configuring the software executed by the terminal for operation of the station, the method further includes loading self-checkout software modules in response to the generated signal indicating a physical configuration for self-checkout operation. The method also initializes and executes the software to operate the station in self-checkout mode. Following conversion of the station to the cashier-assisted configuration, the method of the present invention detects the change in the signal generated in response to the physical configuration conversion and loads the terminal software modules for operating the station in cashier-assisted operation. Thereafter, the method continues to load the software modules for the appropriate operational mode indicated by the generated signal until power is removed from the station and the power on sequence is initiated.

It is an object of the present invention to provide an indication of the physical configuration of a checkout station without requiring operator action.

It is an object of the present invention to configure software for a terminal in a checkout station without requiring operator input.

It is an object of the present invention to provide a more reliable indication of the physical configuration of a checkout stations following a power down of the terminal.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1A:
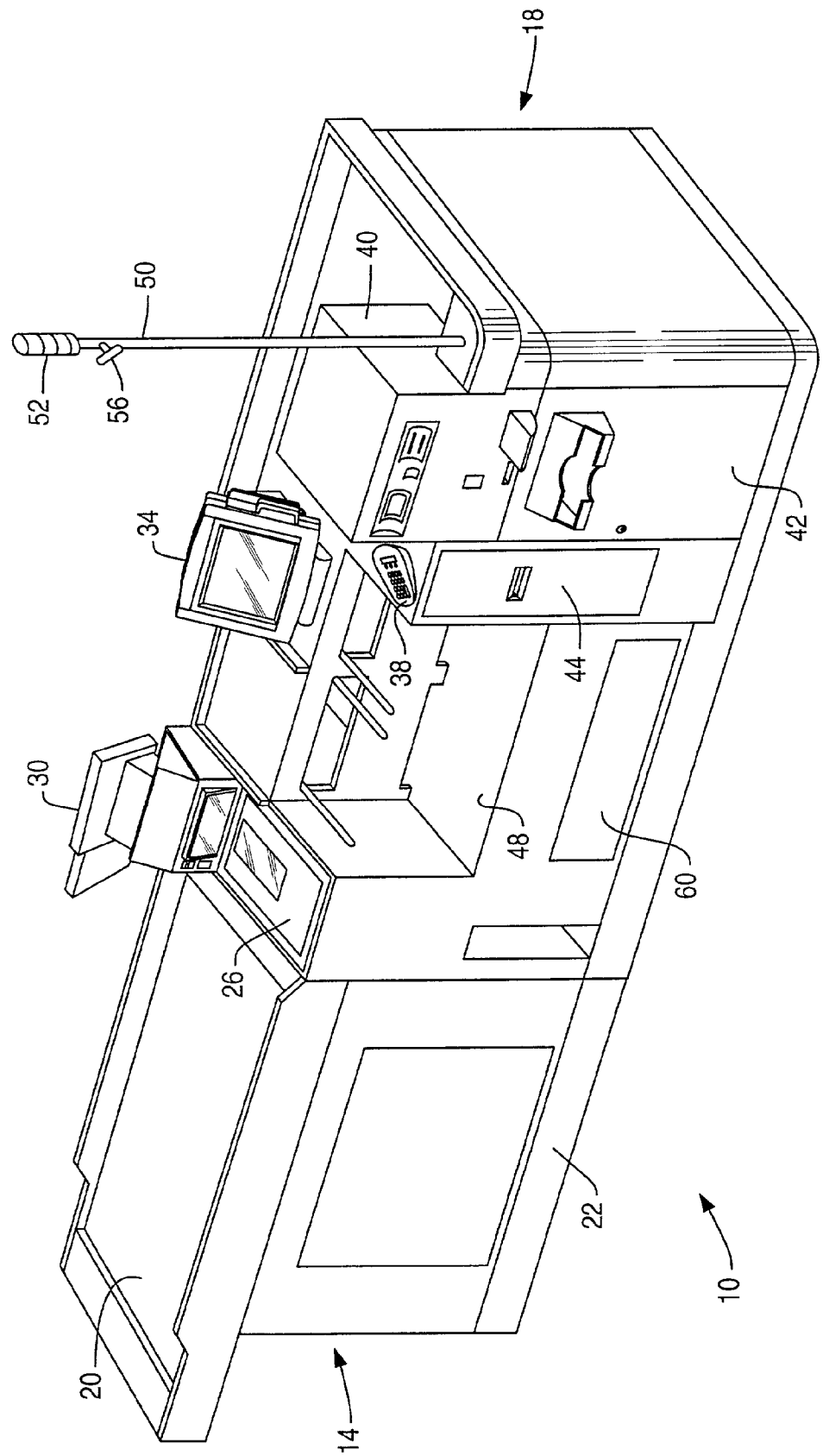
FIG. 1A depicts a convertible checkout station in the self-checkout operational mode in which the present invention may be used.

A convertible checkout station incorporating the system and method of the present invention is shown in FIG. 1A. Convertible checkout station 10 may include a feeder unit 14 and a checkstand 18. Feeder unit 14 includes a feeder belt 20 and housing 22 for the motor and control circuitry required to operate feeder belt 20. Feeder unit 14 is movably coupled to checkstand 18 so the feeder belt may be aligned with scanner/scale unit 26. Checkstand 18 includes scanner/scale unit 26, cashier display and keypad 30, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of items that are sold on a price/unit of weight basis. A cashier may enter item data using cashier display and keypad 30 when station 10 is configured in the cashier-assisted operational mode. Cashier display and keypad 30 are mounted by means of a swivel to scanner/scale unit 26 so assembly 30 may be turned away from the consumer side when station 10 is configured in the self-checkout mode. This is done so a consumer is less likely to be able to use assembly 30 to enter fraudulent item data. Consumer terminal 34 displays item data as it is entered through scanner/scale unit 26. Payment terminal 38 may be any known POS terminal that incorporates a keypad and card reader to support credit card, debit card, and other payment methods. Receipt printer 44 provides a consumer with a receipt itemizing the items purchased and the method of payment.

Separating receipt printer 44 and scanner/scale unit 26 is a security scale 48 in which are disposed bags for item storage and into which consumers may place scanned and weighed items. Security scale 48 uses item weight data derived from scanner/scale 26 or a database using a scanned unit product code (UPC) to verify that only the items scanned are placed on the security scale. Security software operating within terminal 34 monitors security scale 48 to determine whether items not scanned have been added to the security scale area. An anomalous condition that requires investigation may be signaled by lighting a warning or alert light color within the tri-color indicator mounted at the terminal end of indicator pole 50 of checkstand 18. Indicator pole 50 may also have mounted thereon a security camera for providing a video signal to a security officer surveillance area or to some storage media. A database, disk drive, or other computer peripheral required for station operation may be housed within peripheral tray 60 located within checkstand 18. Checkstand 18 also includes upper currency module 40 for receiving currency and coins from a consumer as payment for a transaction while lower currency module 42 returns change to a consumer.

As shown in FIG. 1A, a consumer may place items on feeder belt 20 and belt 20 is driven to bring items to the end of belt 20 where a shut-off mechanism stops belt 20. The consumer may then remove items from belt 20 and move them, one at a time, by scanner/scale 26 for item product data retrieval and/or weighing. The scanned items may then be placed in bags on security scale 48. Once all of the items are scanned, a consumer may provide payment through payment terminal 38 or currency module 40, receive change from module 44, and a receipt from printer 44. The consumer may then remove the bags from security scale 48 and leave station 10.

Figure 1B:
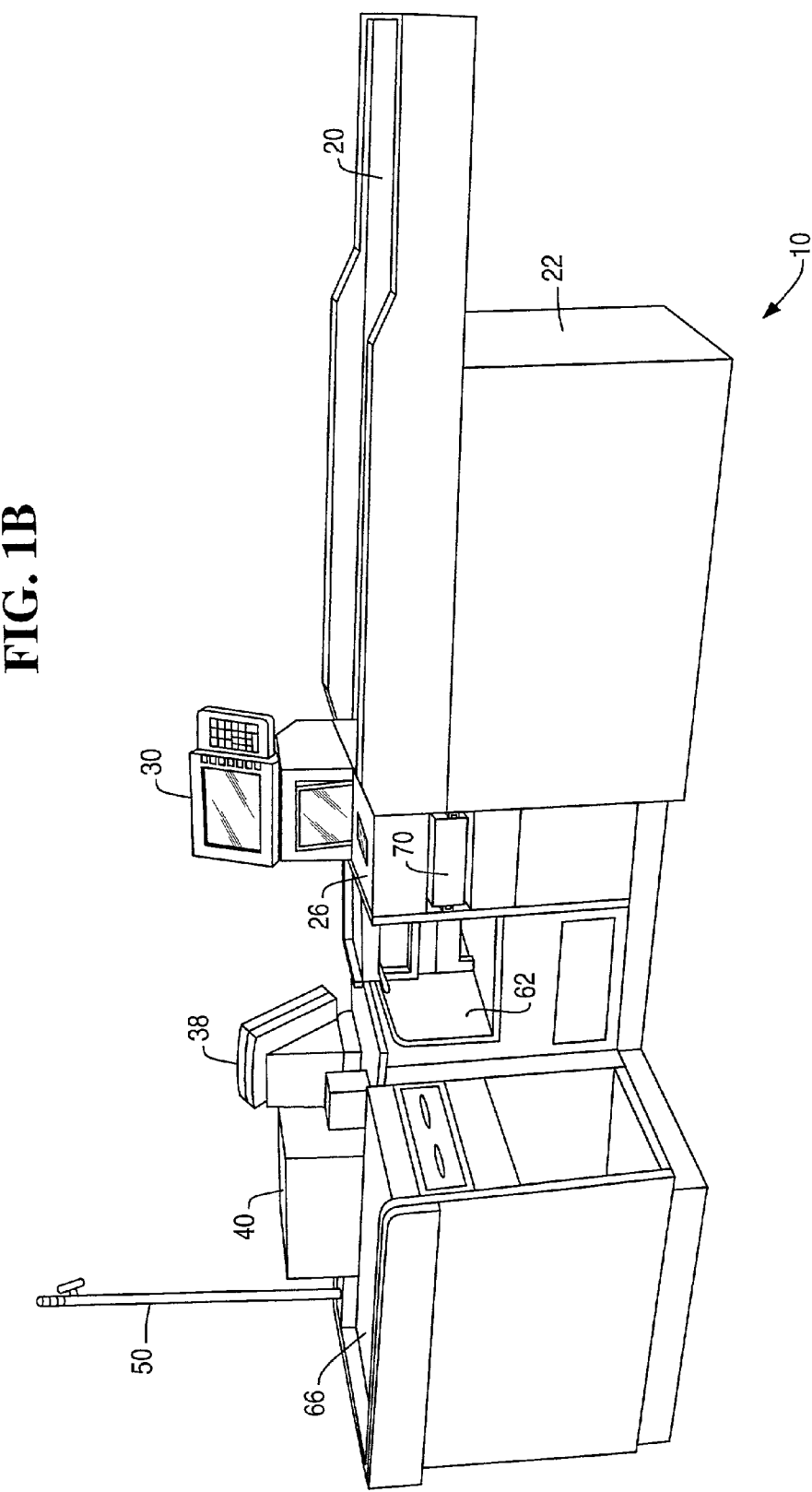
FIG. 1B depicts a convertible checkout station in the cashier assisted operational mode in which the present invention may be used.

Station 10 is shown configured in the cashier-assisted operational mode in FIG. 1B. As shown there, feeder unit 14 is aligned with scanner/scales 26 to facilitate scanning of items by a cashier. Items not being read easily by scanner 26 may have their data entered via keypad 30 by the cashier. A bag storage area 66 is mounted at the outboard end of station 10 to hold bags containing items already scanned or otherwise read. Bags are typically filled in bagging compartment 62 with items transferred to the bags by a cashier after scanning or data entry. The outboard end of sliding drawer 70 is shown in the figure as being latched into a position where it is flush with the outboard end of scanner/scales 26.

Figure 2A:
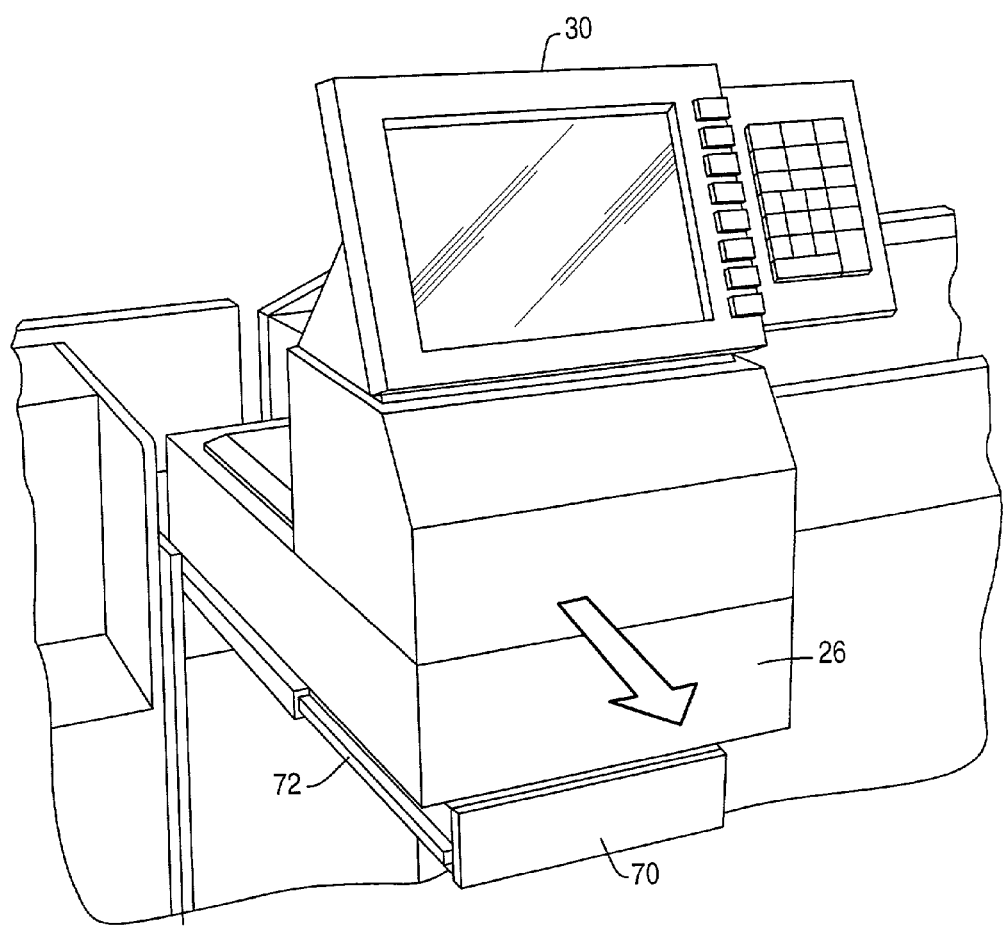
FIG. 2A depicts the cashier side of the station shown in FIG. 1A and a released sliding drawer being withdrawn from the checkstand of the station.
Figure 2B:
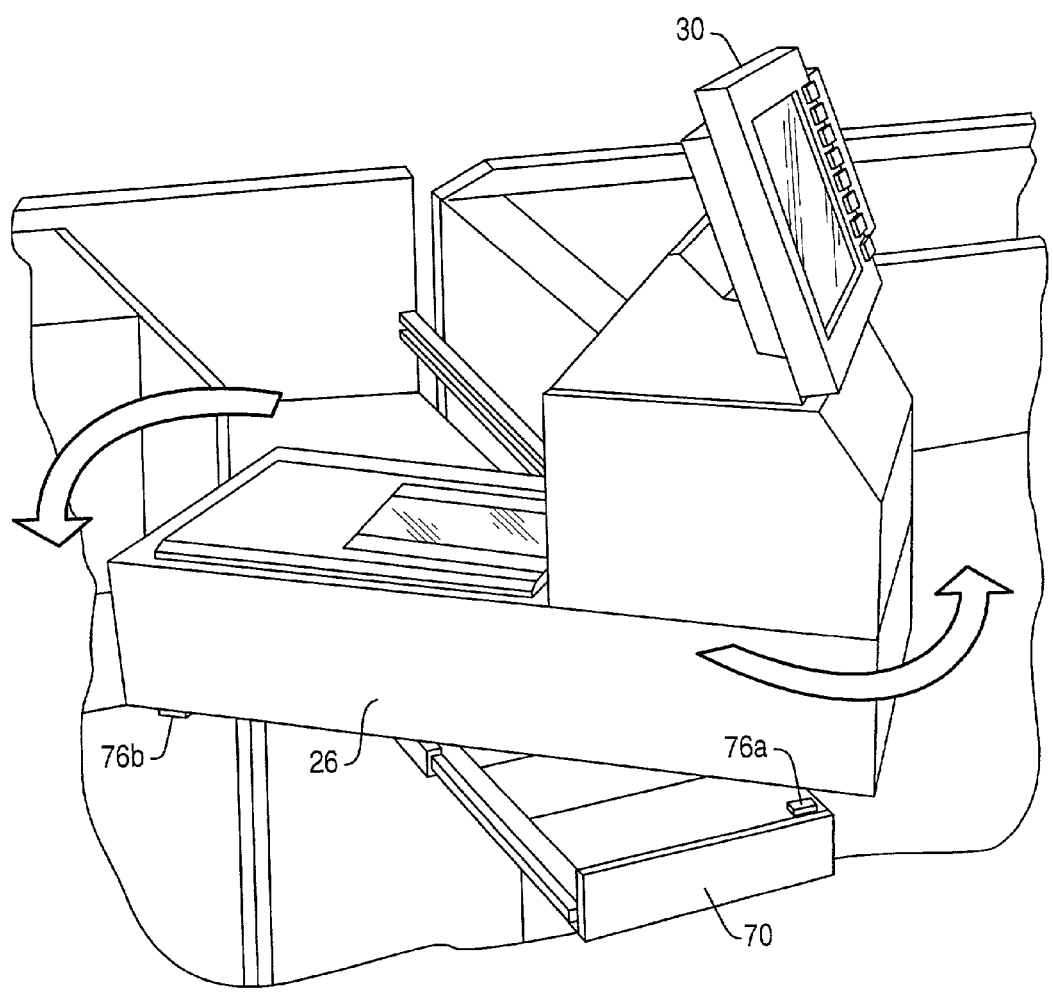
FIG. 2B depicts a scanner atop the sliding drawer of FIG. 2A being rotated to convert the station shown in FIG. 1A.

To convert station 10 from the configuration of FIG. 1A to the configuration in FIG. 1B, sliding drawer 70 is unlatched and withdrawn from its recessed compartment in checkstand 18 as shown in FIG. 2A. Sliding drawer 70 is mounted on slide rails 72 in the recessed compartment and scanner/scales unit 26 is mounted by a swivel on the top surface of sliding drawer 70. The swivel permits scanner 26 to rotate freely in the plane of scanner 26 as shown in FIG. 2B. The rotation of scanner 26 into the position shown in FIG. 2B exposes a switch 76a that is mounted to the upper surface of sliding drawer 70. When sliding drawer is within the recessed compartment and scanner 26 is in position for use by a consumer (from which drawer 70 has just been withdrawn in FIG. 2A), switch 76a is not in proximity to switch 76b mounted to the lower surface of scanner 26 (FIG. 2B). Switches 76a and 76b may be reed switches that close a set of contacts when in proximity to one another but otherwise leave the contacts open. Switch 76a acts an actuator for causing switch 76b to close a signal circuit and generate a signal indicating station 10 is in the physical configuration for the cashier-assisted mode when switch 76b is brought into proximity to switch 76a. Alternatively, switch 76a may be a magnetic sensing, infrared or other radiation sensing switch and switch 76b may instead be a magnet, infrared or other radiation source or reflector. In such an embodiment, switch 76a is actuated by the presence of the magnet or light 76b to generate a physical configuration signal that indicates station 10 is configured for cashier-assisted mode operation. Other alternative embodiments are possible with switch 76b being a tab or other extending member that may engage and depress a plunger of a plunger switch 76a.

While the embodiment shown in FIG. 2B has switch 76a mounted at the outboard end of sliding drawer 70 and actuator 76b mounted on the lower surface of scanner 26, other arrangements of signal generators and actuators are possible. For example, a configuration signal generator may be mounted on one side of the recessed compartment for sliding drawer 70 and the actuating element may be mounted to the side of scanner 26. When the side of scanner 26 to which the actuator is mounted is brought into proximity to the signal generator, the physical configuration signal is generated. When scanner 26 is rotated for conversion to the other operational mode, the actuator resides on the side of scanner 26 that does not face the signal generator and the absence of a signal from the signal generator indicates station 10 is configured for the other operational mode. Likewise, a signal generator may be mounted to the end of the recessed compartment that faces the inboard end of scanner 26 and the actuator mounted to one end of scanner 26. Again, the state of a generated signal that indicates the configuration of station 10 depends upon whether scanner 26 is rotated so the signal generator is proximate the actuator or not. Other arrangements or components may be used to form a signal generator and actuator that generate a signal having at least two states to indicate whether station 10 is in cashier-assisted or self-checkout operational mode. One of the signal generator and actuator may be mounted to a stationary surface that does not alter its position during conversion of station 10 and the other component of the signal generator/actuator combination may be mounted to a surface that moves its position relative to the stationary mounted component during conversion of the station.

Figure 2C:
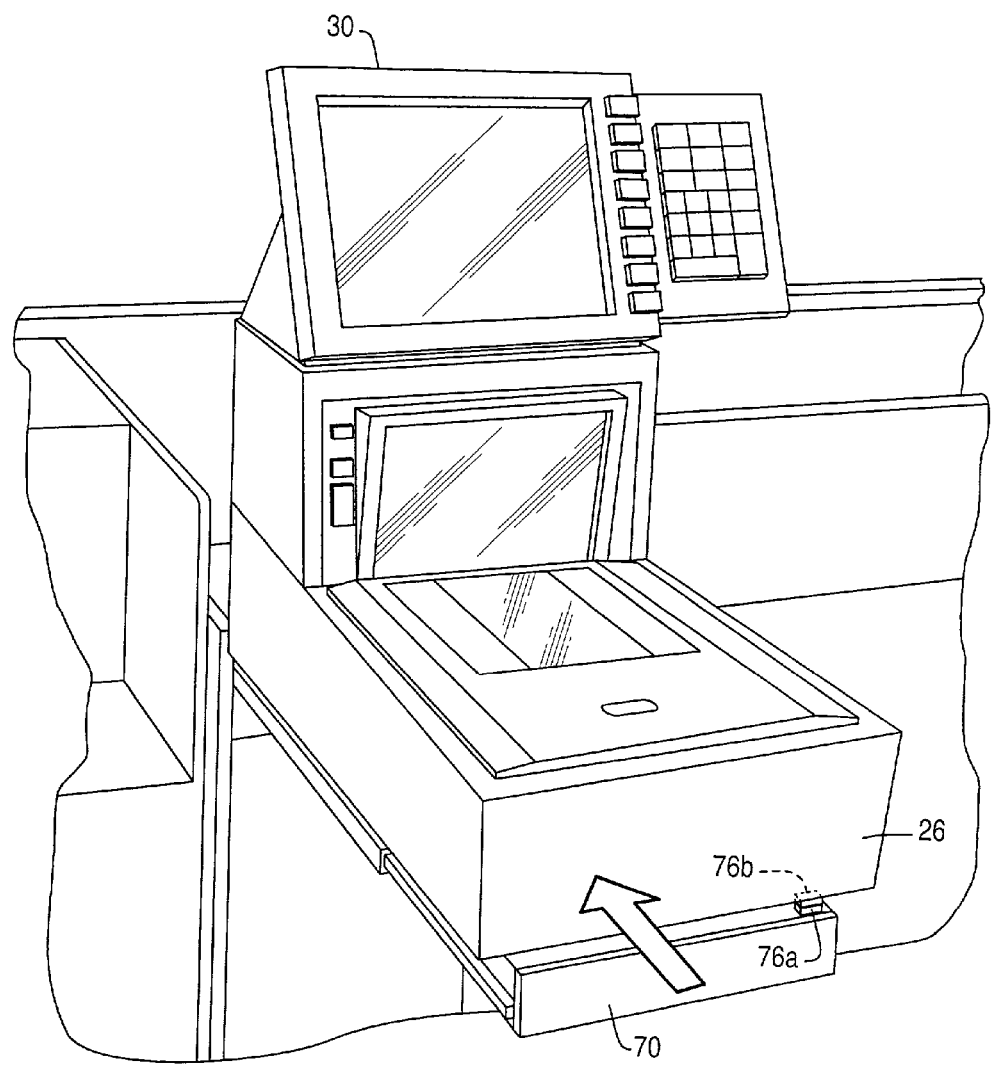
FIG. 2C depicts the rotated scanner and sliding drawer of FIG. 2B being returned to the checkstand of the station and the cashier display rotated away to face the cashier side of the station.

Conversion of station 10 from self-checkout mode to cashier-assisted mode is completed by pushing sliding drawer 70 into its recessed compartment after scanner 26 has been aligned with sliding drawer 70 for cashier-assisted mode operation as shown in FIG. 2C. As depicted in FIG. 2C, cashier display and keypad 30 has been rotated on its swivel so it faces the cashier operator. In the reverse conversion, the rotation of cashier display and keypad 30 is also performed to again rotate the display and keypad away from the consumer. Thus, a consumer has difficulty in accessing keypad 30 regardless of the operational mode of station 10. Also as indicated in FIG. 2C, switches 76a and 76b are proximate one another to close electrical contacts and generate a signal indicating station 10 is configured for cashier-assisted mode. The signal generator and actuator of the present invention may be used to generate a signal having two levels to differently indicate the two operational modes. For example, the signal generator may generate a positive voltage for one mode and a grounded or negative voltage for the other mode. Alternatively, the signal generator may generate two positive or two negative level signal at different voltage levels or, in yet another alternative, a optical signal may be generated to indicate the operational mode of station 10.

Figure 2D:
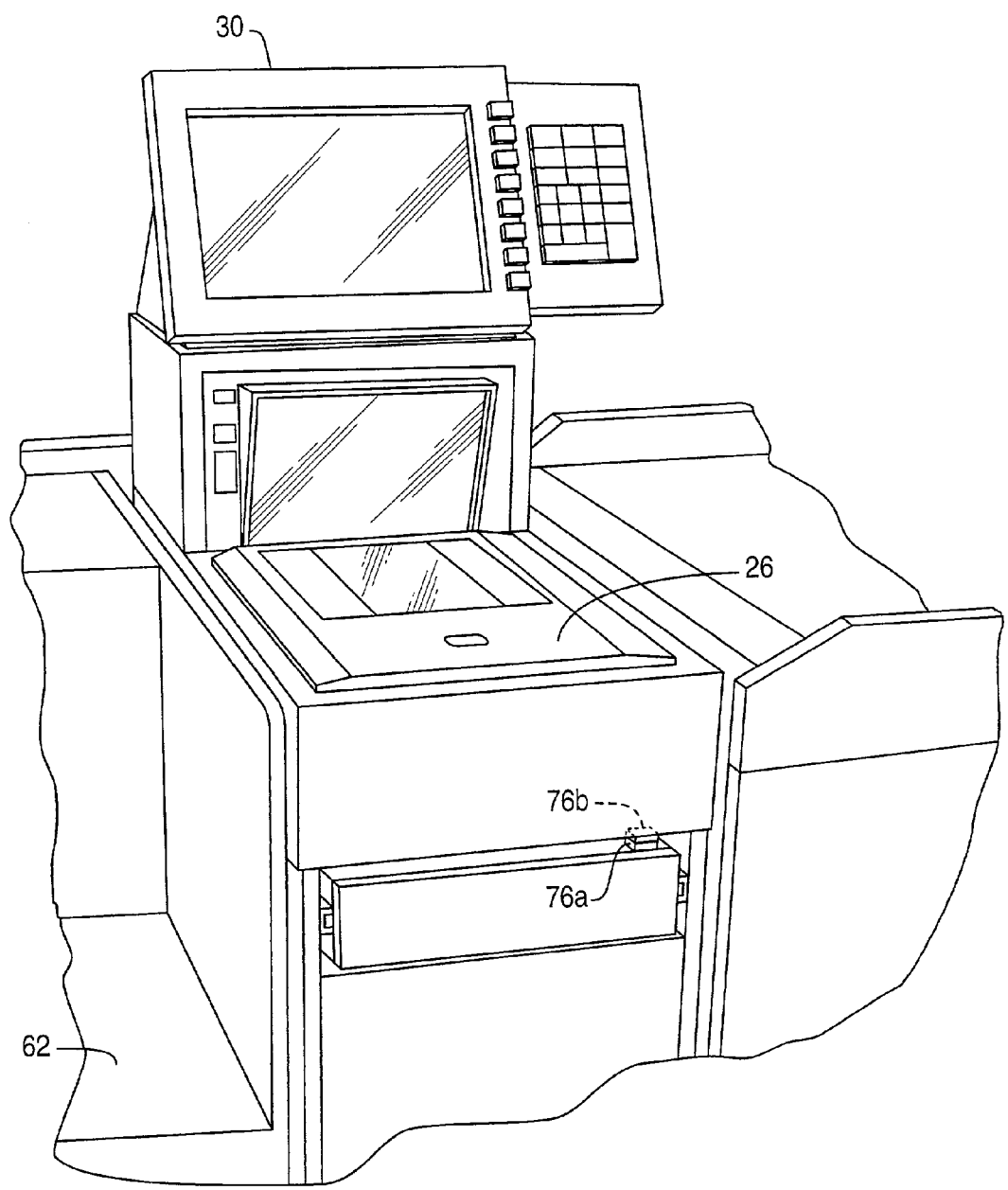
FIG. 2D depicts the sliding drawer being latched in the checkstand to complete the conversion of the station in FIG. 1A to the station in FIG. 1B.
Figure 3:
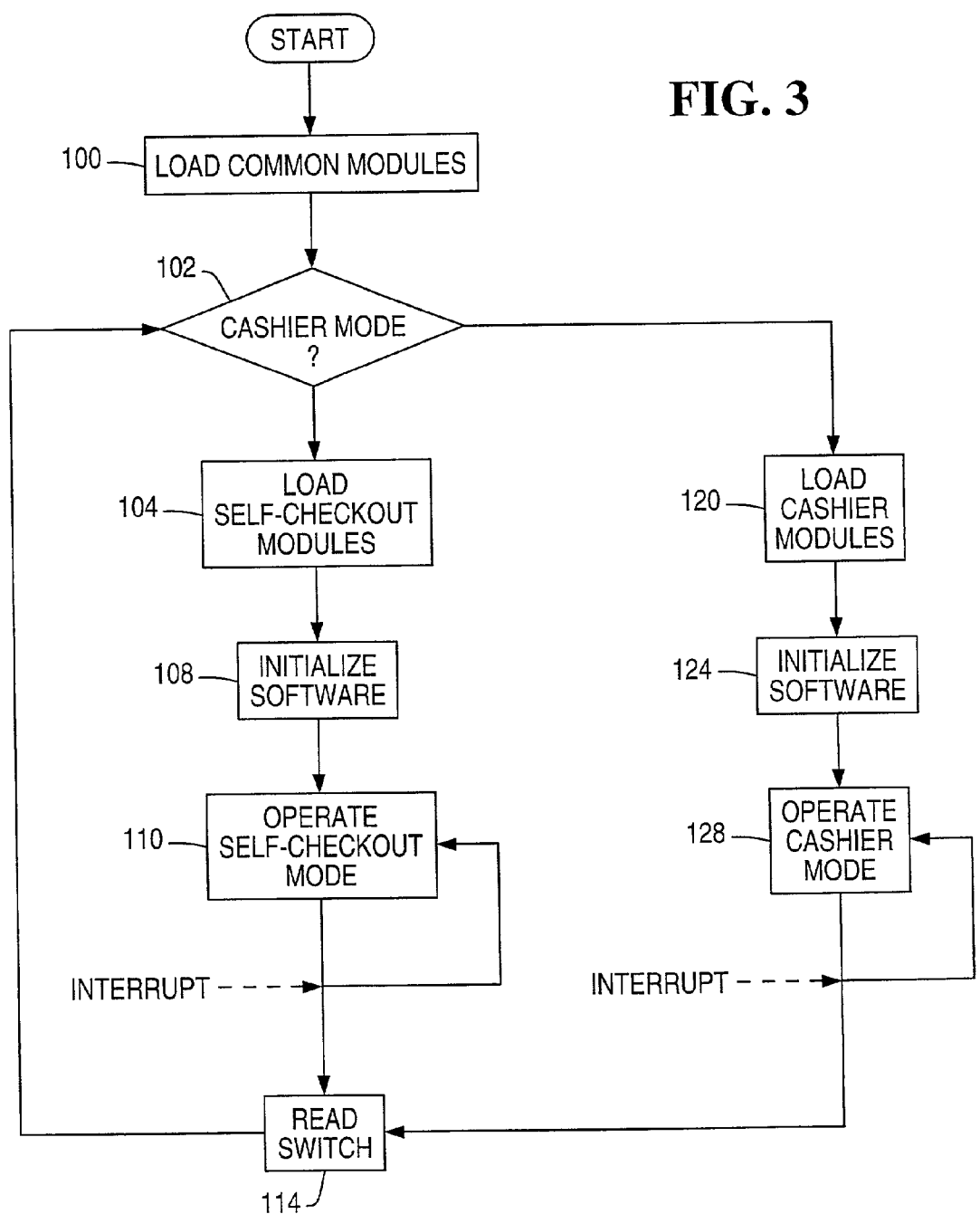
FIG. 3 is a flowchart of an exemplary method for configuring software in the checkout station shown in FIG. 1A or 1B.

Conversion to the cashier-assisted mode is completed by latching sliding drawer 70 into its recessed compartment and then adjusting the alignment of feeder unit 14 with scanner 26 for optimal operation as shown in FIG. 2D. To convert the cashier-assisted configuration to the self-checkout mode, sliding drawer 70 is unlatched and withdrawn from its recessed compartment (reverse direction of FIG. 2C), scanner 26 and keypad 30 rotated on their swivels (reverse direction from FIG. 2B), and sliding drawer 70 returned and latched in its recessed compartment (reverse of FIG. 2A). In that configuration, switches 76a and 76b are not in proximity with one another and the signal generator produces a second signal indicative of the operational mode for that physical configuration.

The method of the present invention uses the signal indicative of the physical configuration of station 10 to initialize and maintain the software configuration for station 10. This software executes in terminal 34 to operate and control the various systems comprising station 10. The method begins by loading the software modules common to both operational modes for station 10 (block 100). The signal indicative of the physical configuration of station 10 is then read to determine the operational mode that corresponds to the indicated physical configuration (block 102). If station 10 is configured in the cashier-assisted arrangement, the self-checkout modules are loaded (block 104), the loaded software is initialized (block 108), and software execution is commenced (block 110). The signal from the signal generator is preferably sampled in response to an interrupt indicating a change in the generated signal (block 114). The signal is then tested to determine what operational mode software is to be loaded (block 102) and the process continues. An alternative to the interrupt driven testing of the generated signal is to test the generated signal on a periodical basis. If the generated signal indicates the cashier-assisted operational mode corresponds to the physical configuration of station 10, the cashier-assisted mode modules are loaded (block 120), the software is initialized (block 124), and station 10 operated in the cashier-assisted mode (block 128) until an interrupt occurs and the generated signal is tested again.

The system and method of the present invention enable the software for operating a convertible checkout station to be configured without an operator having to identify the operational mode of the station. The actuator and signal generator of the present invention cooperate to produce a signal indicative of the physical configuration of the station and that signal may be used to configure the software for operation of the station. The signal indicative of the physical configuration does not require operator intervention for its generation and use. Additionally, the signal from the signal generator provides a reliable indicator of the physical configuration of the station and may be used to determine the appropriate software modules to be loaded for operation of the station following a loss of operational power.

While the present invention has been illustrated by the description of exemplary processes and system components, and while the various processes and components have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for configuring software to correspond to a physical configuration of a convertible checkout station comprising:
    a physical configuration actuator responsive to the physical configuration of the convertible checkout station; and;
    a physical configuration signal generator responsive to the actuator to generate a signal identifying the physical configuration of the convertible checkout station.

2. The system of claim 1 wherein the physical configuration actuator and physical configuration signal generator are reed switches mounted to surfaces brought into proximity to one another in one physical configuration of the checkout station and separated from one another in another physical configuration of the checkout station.

3. The system of claim 1 wherein the physical configuration actuator is a tab mounted to a stationary surface of the checkout station and the physical configuration signal generator is a plunger switch mounted to a surface movable relative to the stationary surface.

4. The system of claim 1 wherein the physical configuration actuator is a magnet mounted to a stationary surface of the checkout station and the physical configuration signal generator is a magnetic switch mounted to a surface movable relative to the stationary surface.

5. The system of claim 1 wherein the physical configuration actuator is a radiation source mounted to a stationary surface of the checkout station and the physical configuration signal generator is a radiation sensing switch mounted to a surface movable relative to the stationary surface.

6. The system terminal of claim 1 wherein the physical configuration actuator is mounted to a stationary surface of the checkout station and the physical configuration signal generator is mounted to a surface movable relative to the stationary surface.

7. The system of claim 6 wherein the stationary surface is a surface of a sliding drawer and the movable surface is a surface of a scanner that is mounted by a swivel to the sliding drawer.

8. The system of claim 6 wherein the stationary surface is a surface of a recessed compartment of the checkout station and the movable surface is a side of a sliding drawer mounted to move with reference to the recessed compartment.

9. The system of claim 6 wherein the stationary surface is a surface of a recessed compartment of the checkout station and the movable surface is one end of a scanner mounted to rotate with respect to the recessed compartment.

10. The system of claim 1 further comprising:
    a processor coupled to the signal generated by the signal generator so that the processor configures software for operating the checkout station in correspondence with the physical configuration indicated by the generated signal.

11. A method for configuring software to correspond to a physical configuration of a convertible checkout station comprising:
    moving a first component of a convertible checkout station to a position relative to a second component of the convertible checkout station to generate a configuration signal that indicates a second physical configuration of the checkout station wherein movement of the first component changes the physical configuration of the checkout station from a first physical configuration to the second physical configuration; and
    determining a software configuration for the checkout station corresponding to the second physical configuration indicated by the configuration signal.

12. The method of claim 11 further comprising:
    loading software modules corresponding to one operational mode for the checkout station.

13. The method of claim 12 further comprising:
    executing the loaded software modules to operate the checkout station in the
    operational mode corresponding to the indicated physical configuration.

14. The method of claim 13 further comprising:
    interrupting the execution of the loaded software modules in response to detection of a change in the position of the first component so that the configuration signal indicates a change in the physical configuration of the checkout station.

15. The method of claim 14 further comprising:
    loading software modules corresponding to another operational mode for the checkout station in response to the detected change in the position of the first component so that the configuration signal indicates a change in the physical configuration of the checkout station.

16. The method of claim 11 further comprising:
loading software modules corresponding to a second operational mode for the checkout station; and
executing the loaded software modules for the second operational mode to operate the checkout station in the second operational mode corresponding to the detected change in the position of the first component of the checkout station.

17. A system for configuring software to correspond to a physical configuration of a convertible checkout station comprising:
means for generating a signal indicative of the physical configuration of a checkout station;
means for detecting the checkout station in a first physical configuration;
means for actuating the generating means so that the generating means generates a configuration signal indicative of the first physical configuration of the checkout station in response to the detecting means detecting the first physical configuration; and
means for determining an operational mode for the checkout station from the configuration signal.

18. The system of claim 17 wherein the generating means changes the configuration signal in response to the detecting means detecting the checkout station is not in the first physical configuration.

19. The system of claim 17 wherein the configuration signal generating means is coupled to a processor for interrupting the processor so that the processor may change software configuration for operating the checkout station in another operational mode.

20. A method for configuring software to correspond to a physical configuration of a convertible checkout station comprising:
detecting a spatial relationship between at least two components of a convertible checkout station;
generating a configuration signal corresponding to the detected spatial relationship; and
determining a software configuration for the checkout station in response to the generated configuration signal.

21. The method of claim 20, the spatial relationship detection further comprising:
detecting rotation of a scanner of the convertible checkout station relative to another component of the convertible checkout station.

22. The method of claim 21, the scanner rotation detection further comprising:
detecting the scanner rotation relative to a sliding drawer position.

23. The method of claim 20, the spatial relationship detection further comprising:
detecting proximity of one reed switch to another reed switch.

24. The method of claim 20, the spatial relationship detection further comprising:
detecting an emission from one component of the convertible checkout station.

25. The method of claim 24, the emission detection further comprising:
detecting an emitted radiation field from the one component.

26. The method of claim 25, the emitted radiation field detection further comprising:
detecting a magnetic field emitted from the one component.

27. The method of claim 24, the emission detection further comprising:
detecting an optical signal emitted from the one component.

28. The method of claim 25, the optical signal detection further comprising:
detecting an infrared signal emitted by the one component.

29. The method of claim 20, the spatial relationship detection further comprising:
detecting a mechanical extension from the one component.

30. The method of claim 29, the mechanical extension detection further comprising:
detecting a tab extending from the one component with a switch extending from the other component of the convertible checkout station.

31. A method for configuring software to correspond to a physical configuration of a convertible checkout station comprising:
moving a scanner component of the convertible checkout station from a first physical position to a second physical position;
detecting the scanner component is in the second physical position;
generating a configuration signal that indicates the scanner component is in the second physical position; and
selecting a software configuration for the checkout station corresponding to the physical configuration of the checkout station indicated by the generated configuration signal.

* * * * *